US009251395B1

(12) United States Patent
Botchen (10) Patent No.: US 9,251,395 B1
(45) Date of Patent: Feb. 2, 2016

(54) PROVIDING RESOURCES TO USERS IN A SOCIAL NETWORK SYSTEM

(75) Inventor: Ralf Botchen, Belo Horizonte (BR)

(73) Assignee: Google Inc., Mountain View, CA (US)

( * ) Notice: Subject to any disclaimer, the term of this patent is extended or adjusted under 35 U.S.C. 154(b) by 201 days.

(21) Appl. No.: 13/489,403

(22) Filed: Jun. 5, 2012

(51) Int. Cl.
*G06K 9/00* (2006.01)
(52) U.S. Cl.
CPC .................................. *G06K 9/00* (2013.01)
(58) Field of Classification Search
USPC ......... 382/100, 118, 203, 209, 305, 103, 155, 382/173
See application file for complete search history.

(56) References Cited

U.S. PATENT DOCUMENTS

| | | | | | |
|---|---|---|---|---|---|
| 7,519,200 | B2 * | 4/2009 | Gokturk | ............ | G06F 17/30253 382/118 |
| 7,599,549 | B2 * | 10/2009 | Li | ............ | G06K 9/00288 382/103 |
| 7,920,072 | B2 * | 4/2011 | Smith | ............ | G01C 21/26 340/10.1 |
| 2005/0105803 | A1 * | 5/2005 | Ray | ............ | G06F 17/30256 382/209 |
| 2006/0253491 | A1 * | 11/2006 | Gokturk | ............ | G06F 17/30256 |
| 2008/0002864 | A1 * | 1/2008 | Das | ............ | G06K 9/00664 382/118 |
| 2008/0050015 | A1 * | 2/2008 | Lu | ............ | G06K 9/00711 382/173 |
| 2008/0212851 | A1 * | 9/2008 | Ray | ............ | G06F 17/30256 382/118 |
| 2008/0255977 | A1 * | 10/2008 | Altberg | ............ | G06F 17/30979 705/35 |
| 2009/0161962 | A1 * | 6/2009 | Gallagher | ............ | G06F 17/30247 382/203 |
| 2009/0171783 | A1 | 7/2009 | Raju | | |
| 2010/0172551 | A1 * | 7/2010 | Gilley | ............ | G06K 9/00288 382/118 |
| 2010/0287053 | A1 | 11/2010 | Ganong et al. | | |
| 2011/0099199 | A1 | 4/2011 | Stalenhoef et al. | | |
| 2011/0238503 | A1 | 9/2011 | Naini | | |
| 2011/0276396 | A1 * | 11/2011 | Rathod | ............ | G06F 17/30867 705/14.49 |
| 2013/0262588 | A1 * | 10/2013 | Barak | ............ | H04L 67/22 709/204 |

OTHER PUBLICATIONS

"Vufind Launches Unique Photo/Video Tagging and Visual Social Networking App for iPhone", PR Newswire, Nov. 22, 2010.

* cited by examiner

*Primary Examiner* — Vu Le
*Assistant Examiner* — Aklilu Woldemariam
(74) *Attorney, Agent, or Firm* — IP Spring (57) ABSTRACT

Embodiments generally relate to providing resources to users in a social network system. In one embodiment, a method includes recognizing one or more faces of one or more people in at least one photo, and recognizing at least one object in the at least one photo. The method also includes creating at least one indication of affinity or association with the at least one object, and associating the at least one indication with at least one resource.

20 Claims, 6 Drawing Sheets

PROVIDING RESOURCES TO USERS IN A
SOCIAL NETWORK SYSTEM

TECHNICAL FIELD

Embodiments relate generally to social network systems, and more particularly to providing resources to users in a social network system.

BACKGROUND

Social network systems typically enable users to share resources such as webpages, photos, announcements, etc. To find particular resources such as a webpage, inside or outside of a social network, a user typically performs a search, which involves the user typing key words into a search field, pressing a button to initiate the search, and then reviewing the search results. The user may then access the webpage by clicking on a link on the search results page. Clicking on the link brings the user to the webpage. The webpage itself may provide the user with additional resources including data, information, and other resources. While search engines and search results have improved significantly over the years, the user still needs to sort through irrelevant results in order to find a particular resource of interest.

SUMMARY

Embodiments generally relate to providing resources in a social network system. In one embodiment, a method includes recognizing one or more faces of one or more people in at least one photo, and recognizing at least one object in the at least one photo. The method also includes creating at least one indication of affinity or association with the at least one object, and associating the at least one indication with at least one resource.

With further regard to the method, in one embodiment, the at least one object is a logo. In another embodiment, the at least one object is an expression. In another embodiment, the at least one object is landmark. In one embodiment, the method includes tagging the at least one object with an identifying tag. In one embodiment, the method includes enabling a user to determine an identifying tag to be associated with the at least one object. In one embodiment, the method includes suggesting an identifying tag to be associated with the at least one object. In one embodiment, the at least one resource includes a social network advertisement. In one embodiment, the at least one resource includes a social network page. In one embodiment, the method includes providing the at least one resource to the one or more people recognized in the at least one photo.

In another embodiment, a method includes recognizing one or more faces of one or more people in at least one photo; recognizing at least one object in the at least one photo, where the at least one object is one of a logo, an expression, and a landmark; and tagging the at least one object with an identifying tag, where the identifying tag is determined by a user of a social network. The method also includes creating at least one indication of affinity or association with the at least one object; associating the at least one indication with at least one resource, where the at least one resource includes one or more of a social network advertisement, a social network page, and a webpage; and providing the at least one resource to the one or more people recognized in the at least one photo.

In another embodiment, a system includes one or more processors, and logic encoded in one or more tangible media for execution by the one or more processors. When executed, the logic is operable to perform operations including: recognizing one or more faces of one or more people in at least one photo; recognizing at least one object in the at least one photo; creating at least one indication of affinity or association with the at least one object; and associating the at least one indication with at least one resource.

With further regard to the system, in one embodiment, the at least one object is a logo. In another embodiment, the at least one object is an expression. In another embodiment, the at least one object is landmark. In one embodiment, the logic when executed is further operable to perform operations including tagging the at least one object with an identifying tag. In one embodiment, the logic when executed is further operable to perform operations including enabling a user to determine an identifying tag to be associated with the at least one object. In one embodiment, the logic when executed is further operable to perform operations including suggesting an identifying tag to be associated with the at least one object. In one embodiment, the at least one resource includes a social network advertisement. In one embodiment, the at least one resource includes a social network page. In one embodiment, the logic when executed is further operable to perform operations including providing the at least one resource to the one or more people recognized in the at least one photo.

DETAILED DESCRIPTION

Embodiments described herein provide resources in a social network system using indications of affinity or association with objects recognized in photos in the social network system. In one embodiment, a system recognizes one or more faces of people in a photo using a recognition algorithm. The system also recognizes one or more objects in the photo using a recognition algorithm. The object may be, for example, a logo, an expression such as a business name, a landmark, etc. The system then tags the object with an identifying tag and creates an indication of affinity or association with the object. The system may associate the indication with at least one resource such as a social network advertisement, a social network page, etc. The system may then provide the resource to the one or more people recognized in the photo.

For example, if the resource is a webpage, the system may provide a link to the social network page to the one or more recognized people when they are looking at the photo. In another example, if the resource is an advertisement, the system may display the advertisement to the one or more recognized people when they are looking at the photo.

Figure 1:
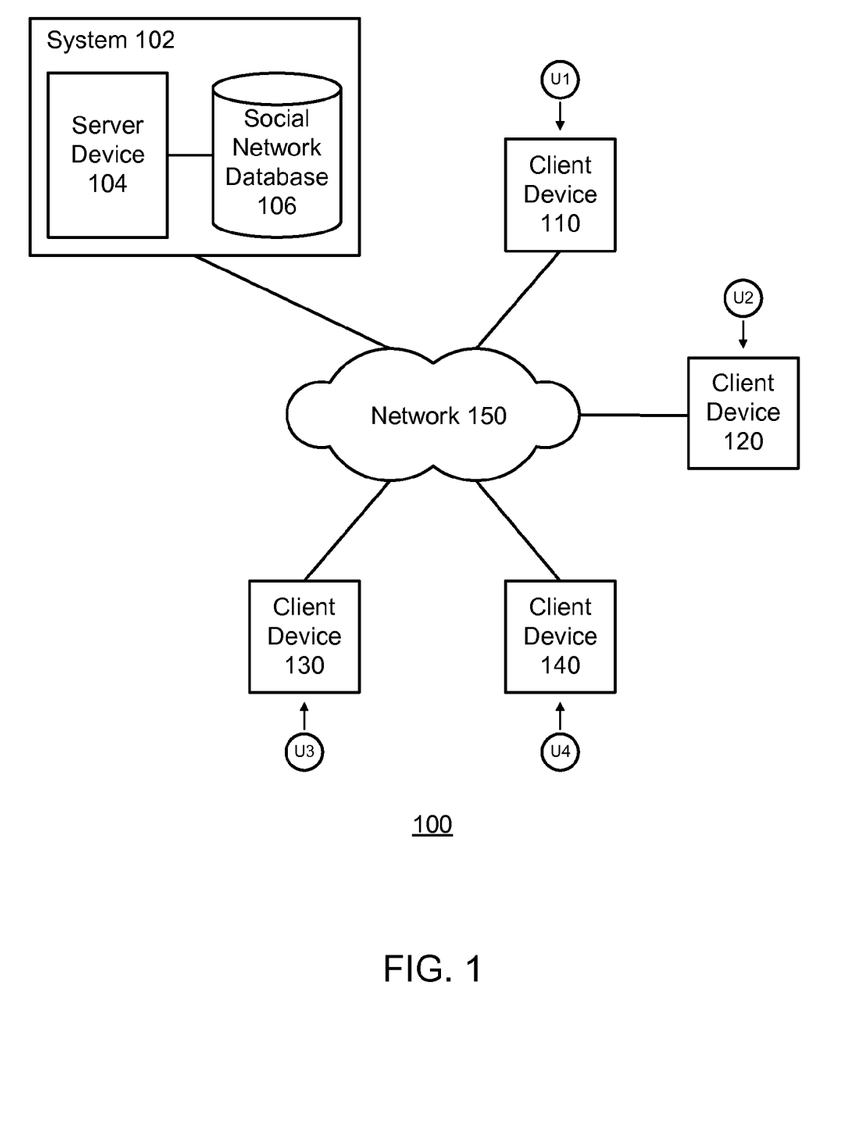
FIG. 1 illustrates a block diagram of an example network environment, which may be used to implement the embodiments described herein.

FIG. 1 illustrates a block diagram of an example network environment 100, which may be used to implement the embodiments described herein. In one embodiment, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150. Each client device 110, 120, 130, and 140 may be any type of electronic device such as a mobile phone, a tablet, a computer, etc.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein. In various embodiments, users U1, U2, U3, and U4 may communicate with each other and may interact with system 102 using respective client devices 110, 120, 130, and 140.

Figure 2:
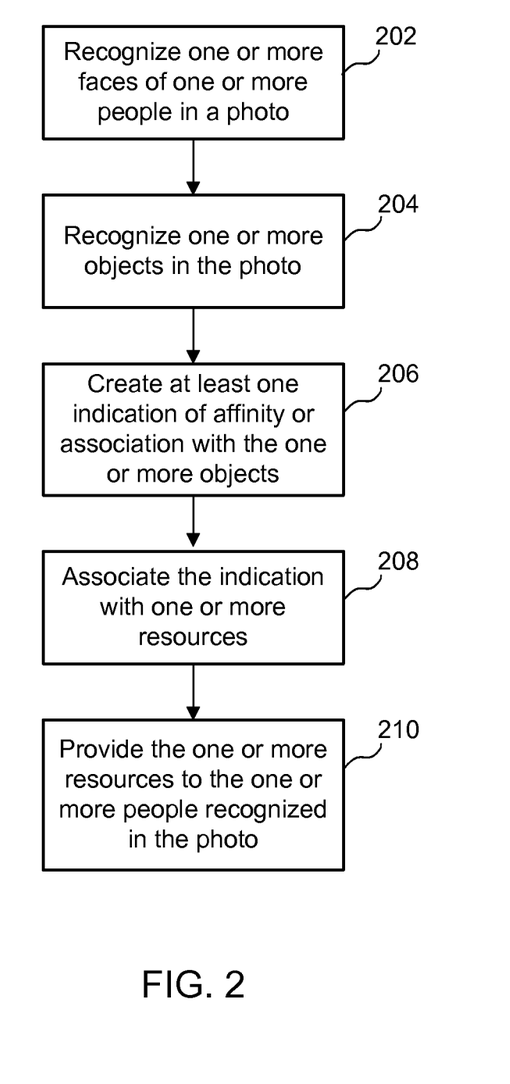
FIG. 2 illustrates an example simplified flow diagram for providing resources to users in a social network system, according to one embodiment.

FIG. 2 illustrates an example simplified flow diagram for providing resources to users in a social network system, according to one embodiment. Referring to both FIGS. 1 and 2, a method is initiated in block 202, where system 102 recognizes one or more faces of one or more people in a photo. In various embodiments, system 102 may recognize the one or more faces of people in the photo using any suitable recognition algorithm. Various example embodiments directed to recognition algorithms are described in more detail below.

In block 204, system 102 recognizes one or more objects in the photo. In various embodiments, system 102 may recognize the one or more objects in the photo using any suitable recognition algorithm. Various example embodiments directed to recognition algorithms are described in more detail below.

For ease of illustration, some embodiments are described in the context of one photo. The embodiments described herein also apply to multiple photos. For example, different photos may have different combinations of recognized people and recognized objects. In various embodiments, system 102 may obtain photos from any suitable database such as social network database 106 or from a combination of any suitable client devices (e.g., client devices 110, 120, 130, and 140).

In various embodiments, the object recognized in the photo may represent various types of items. Also, recognized objects may be represented as pages (entities) in the social network system, and users may interact with such pages. In one embodiment, an object may be a logo. The logo may be a brand logo placed on clothing. In an example scenario, system 102 may recognize a brand logo that is located on the cap or t-shirt of a person in the photo. In other example scenarios, system 102 may recognize logos located anywhere or on any given object in a given photo.

In one embodiment, the object may be an expression. In various embodiments, an expression may be any alphanumeric character, characters, word or words. An expression may also be any symbol or symbols. In various embodiments, an expression identifies an entity. For example, an expression may be a name of a person, a business name, a brand name, event name, community name, etc. An expression may be in any natural language. In an example scenario, system 102 may recognize an expression on an advertisement such as a sign, marquee, wall, billboard, etc. in the background of the photo.

In one embodiment, the object may be a landmark, tourist sight, or historic place, etc. In an example scenario, system 102 may recognize a particular landmark such as a particular mountain peak, monument, building, structure, tourist sight, or historic place, etc.

In various embodiments, the object may also be an entity that is not necessarily recognized visually. The object may be any real-world object or site that is detected on a map by global positioning system (GPS) technology associated with the camera device that captured the image. For example, a photo may be taken at a theme park, where a visual indicator of the theme park may or may not be recognizable in a particular photo. System 102 may recognize the theme park based at least in part by the geographic positioning of the theme park and the geotag metadata associated with the photo. In various embodiments, the object may be any place such as a business (e.g., restaurant, bar, hotel, etc.), tourist sight, airport, train station, etc.

In one embodiment, system 102 tags the object in the photo with an identifying tag. In one embodiment, system 102 may automatically tag the object in the photo. In another embodiment, system 102 may enable any user of the social network to determine the identifying tag to be associated with the object. For example, in one embodiment, system 102 may suggest one or more identifying tags to be associated with the object, and then enable the user to select an identifying tag. System 102 may determine one or more identifying tags by matching the recognized object to associated information in a database such as social network database 106.

Figure 3:
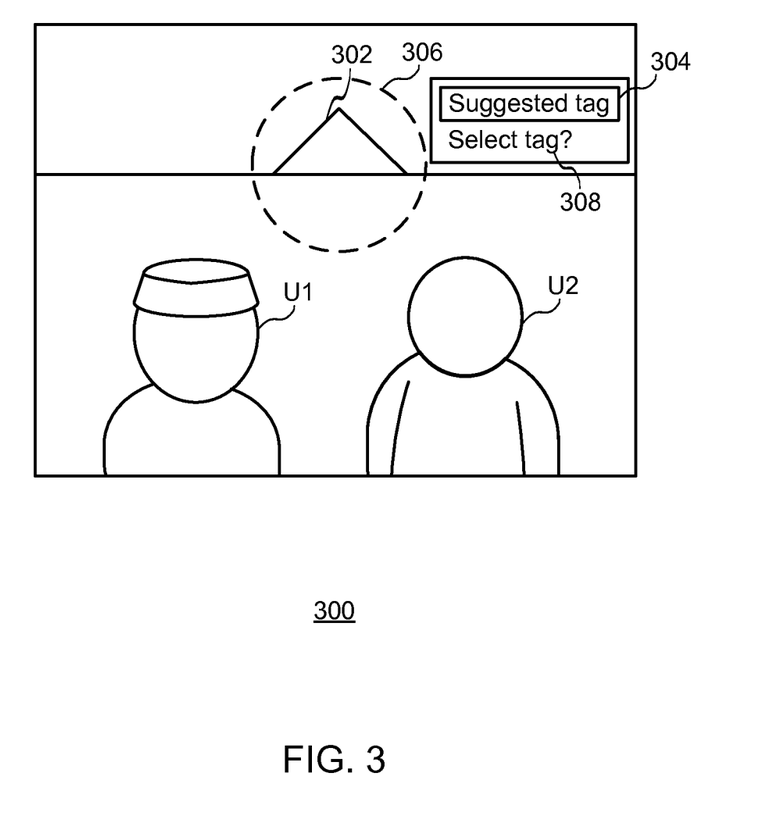
FIG. 3 illustrates an example simplified diagram representing a photo of two people standing in front of a landmark, where the photo also shows a suggested tag for the landmark, according to one embodiment.

FIG. 3 illustrates an example simplified diagram representing a photo 300 of two people U1 and U2 standing in front of a landmark 302, where photo 300 also shows a suggested tag 304 for landmark 302, according to one embodiment. As shown, in one embodiment, system 102 may delineate a recognized object such as landmark 302 with any suitable visual marking such as a dotted boundary line 306 (e.g., dotted circle, emphasized image portion, changed pointer, etc.). In one embodiment, dotted boundary line 306 may indicate an opportunity for a user to determine a tag to be associated with an object.

System 102 may then provide suggested tag 304 and a prompt 308 (e.g., "Select tag?") next to the dotted boundary line 306, and enable the user to accept the suggestion by selecting or clicking the suggested tag 304. In one embodiment, system 102 causes dotted boundary line 306, tag 304, and prompt 308 to be displayed when the user hovers a pointer over landmark 302. If system 102 provides multiple suggestions, system 102 may enable the user to accept one of the suggested tags by selecting or clicking one of them. In one embodiment, if there are numerous possible tags, system 102 may provide a subset of all possible tags in order to simplify the tag selection process. In one embodiment, system 102 may enable the user to manually type in a tag and select it. In one embodiment, manually typed tags may be enhanced by system 102 providing auto-complete suggestions of known entities from the social network system while the user types.

Referring still to FIG. 2, in block 206, system 102 creates at least one indication of affinity or association with the one or more objects. In various embodiments, an indication may include any information or metadata that indicates an affinity and/or association with a recognized object in a photo. For example, if a recognized object is a particular landmark (e.g., Sugarloaf Mountain), system 102 may create an indication associated with the particular landmark. In various embodiments, an indication is indicative of social significance with respect to the object, and the indication may be referred to as and used interchangeably with the phrase "social signal." In various embodiments, a social signal may be associated or linked a user to another entity in the social network. The other entity may be another user, an advertisement, a company/business page, etc. A social signal generally expresses a user's interests, and may be used to suggest or link the user to other entities within the social network system. A social signal may also be used outside of a social network system. For example, system 102 may use a social signal to trigger customized advertisements (e.g., content advertisements, text advertisements, etc.) on other websites. In one embodiment, system 102 may send one or more social signals associated with the recognized object to an advertisement system in order to enable the advertisement system to provide better advertisements to users.

In one embodiment, a particular object such as a landmark being captured in someone's photo is indicative of the object being significant to the person who captured the photo. The indication becomes stronger if people known to the person are shown standing in front of the object (e.g., friends standing in front of a monument). In various embodiments, system 102 may use an indication of affinity or association with a recognized object in combination with other indications in order to compute information about people. For example, if system 102 recognizes an object (e.g., a monument) in a photo being captured in one country, and system 102 determines that a person in the same photo resides in another country (e.g., from a residence indication), system 102 may conclude that the person is visiting or touring the country where the picture was captured. As indicated above, these indications may be referred to as social signals.

In various embodiments, a suggested recognized object (e.g., landmark, brand, logo, etc.) may be represented as an entity in the social network system (e.g., business page, brand page, fan page, movie page, event page, community page, etc.). In one embodiment, if an object is recognized that is not yet represented by an entity in the social network, system 102 may suggest to the user to create a new entity (e.g., a page) for the object.

In block 208, system 102 associates the at least one indication of affinity or association with one or more resources. In various embodiments, resources may be any items that may be useful to users of the social network. In various embodiments, a resource may be an entity of a social network system with whom a user can interact. For example, a resource may be a user (e.g., a person), a company (e.g., for business pages), a discussion group (e.g., community) or an event. Resources may also include social network pages, webpages, and social network advertisements. Social network pages are useful resources, because they may contain useful content such as tips and suggestions. Examples of social network pages may include pages, event pages, community pages, fan pages, artist pages, movie pages, etc. Examples of webpages may include webpages outside of a social network such as business webpages. Business webpages and advertisements are useful resources, because they may contain useful information about products and services that a user may seek. Such social network pages and webpages may be created and owned by individual users, businesses and other organizations, etc. In one embodiment, an advertisement may be an active resource in the social network system. In another embodiment, an advertisement may also be a passive resource such as a displayed advertisement, an image, a textual link within and/or outside of the social network system, etc.

In block 210, system 102 provides the one or more resources to the one or more people recognized in the photo. System 102 may provide the resources in a variety of ways. For example, in one embodiment, system 102 enables each of the users recognized in the photo to add the resource associated with the recognized object to a social network group associated with the user. For example, if the resource is a business website, a given user recognized in the photo may add the business website to a social network group (e.g., a social network group for business websites, general interests, etc.). In one embodiment, system 102 may suggest that the user follow the at least one object in the social network. In one embodiment, a user may follow a particular object by adding a resource associated with the object to a group of the user.

Figure 4:
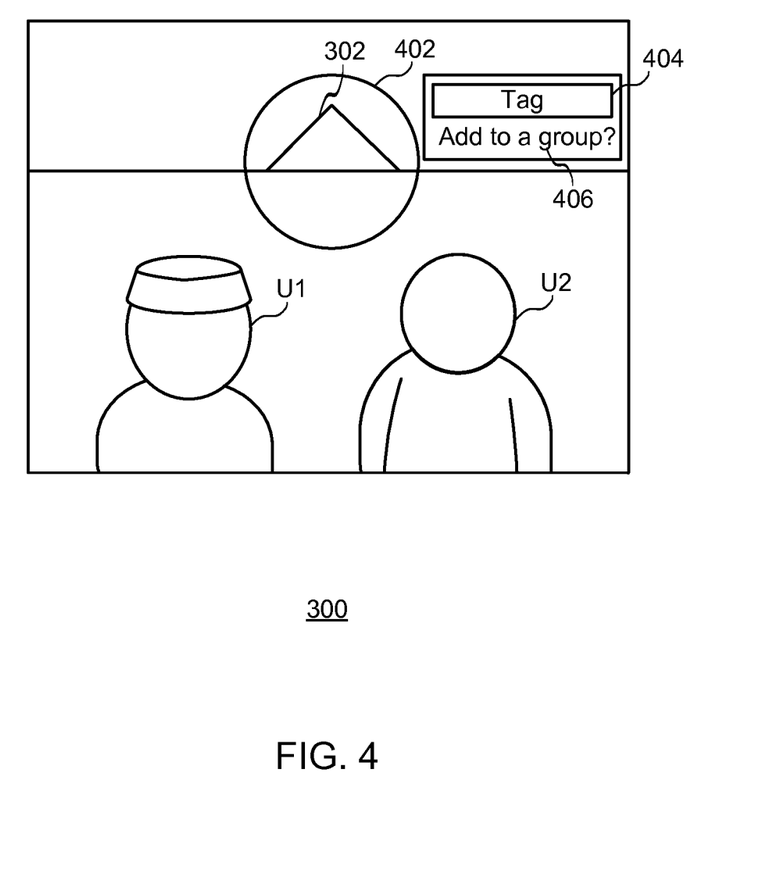
FIG. 4 illustrates an example simplified diagram representing the photo of FIG. 3, where the photo shows an identified and tagged landmark with a suggestion to add a resource associated with the landmark to a group, according to one embodiment.

FIG. 4 illustrates an example simplified diagram representing photo 300 of FIG. 3, where photo 300 shows landmark 302 with a suggestion to add an already known and tagged resource associated with landmark 302 to a group, according to one embodiment. As shown, landmark 302 is delineated with a visual marking that is solid boundary line 402 (e.g., dotted circle, etc.) instead of a dotted boundary line. In one embodiment, a tagged object with a solid boundary line 402 may indicate an opportunity for users (e.g., user U1 and user U2) to add a resource associated with an object to a group.

In one embodiment, system 102 may cause a tag 404 and a prompt 406 (e.g., "Add to a group?") to be displayed next to solid boundary line 402, where system 102 enables users (e.g., user U1 and user U2) to add a resource associated with landmark 302 to a group. In one embodiment, system 102 causes solid boundary line 402, tag 404, and prompt 406 to be displayed when the user hovers a pointer over the landmark 302.

In one embodiment, a given user (e.g., user U1 and/or user U2) may then select or click on the prompt or any other appropriate button to add the resource to one or more groups. In one embodiment, after the user selects to add the resource to a group, system 102 may provide another prompt (not shown) to enable the user to select a group or to create a new group.

If the resource is a social network page, or webpage, after having added the social network page, or webpage, to a group, the user (e.g., users U1 and U2) may conveniently access the social network page, or webpage. Such a resource may, for example, provide useful information (e.g., tips, suggestions, etc.) associated with an object such as landmark 302. In various embodiments, system 102 enables a user to add to groups, social network pages (e.g., business pages, community pages, event pages, artist pages, commercial pages, etc.) as well as webpages that exists outside the social network system. The user may then interact with the social network pages and/or webpages by reading posts, commenting on posts, re-sharing, and liking content, etc.

In one embodiment, if the resource is an advertisement, system 102 may accurately provide relevant advertisements to people recognized in the photo. For example, when the people recognized in the photo are looking at the photos, system 102 may provide advertisements associated with similar landmarks, tourist sites, vacation packages, etc., on the same page. In one embodiment, even when the user is not looking at a particular photo, system 102 may create social signals for brands, logos, advertisements, etc., linked to a user that can be used in other places inside or outside of the social network system. For example, the signal may be used by another advertisement system to trigger user customized advertisements anywhere on the web.

Figure 5:
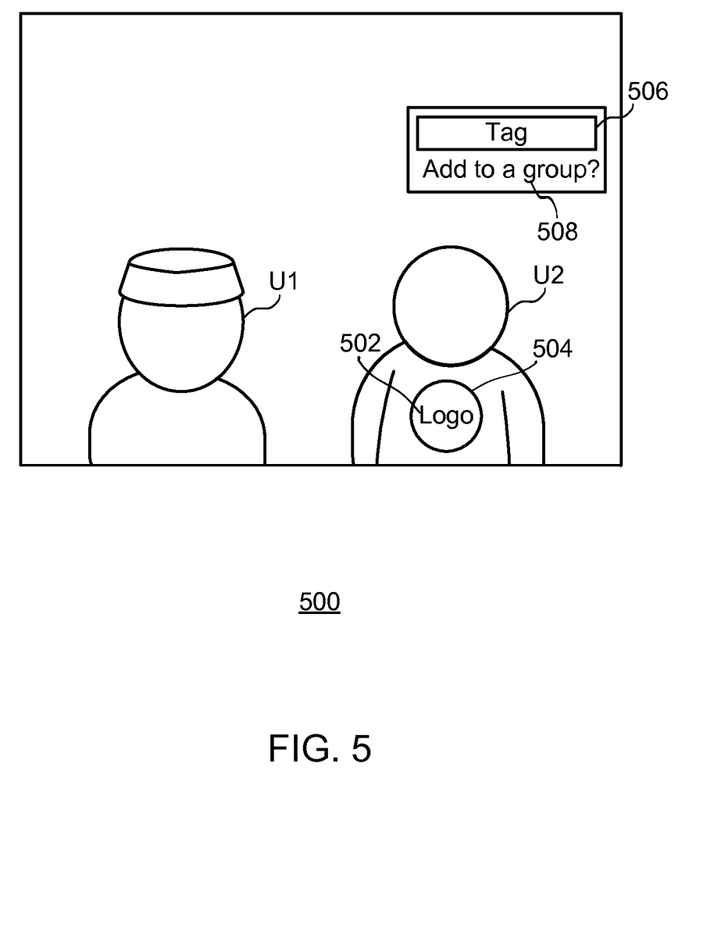
FIG. 5 illustrates an example simplified diagram representing a photo of two people, one of whom is wearing a t-shirt with a logo, where the photo also shows a suggestion to add a resource associated with the logo to a group, according to one embodiment.

FIG. 5 illustrates an example simplified diagram representing a photo 500 of two people U1 and U2, one of whom is wearing a t-shirt with a logo 502, where photo 500 also shows a suggestion to add a resource associated with the logo to a group, according to one embodiment. As shown, logo 502 is delineated with a visual marking that is solid boundary line 504 (e.g., dotted circle, etc.), which indicates an opportunity for users (e.g., user U1 and user U2) to add a resource associated with an object to a group. Also shown is a tag 506 associated with the object and a prompt 508 (e.g., "Add to a group?"), where system 102 enables users (e.g., user U1 and user U2) to add a resource associated with logo 502 to a group. In one embodiment, system 102 causes solid boundary line 504, tag 506, and prompt 508 to be displayed when the user hovers a pointer over the logo 502.

Some embodiments are described herein in the context landmarks and logos. These are some examples of objects in photos that system 102 may recognize. The embodiments described herein apply to other objects as well. For example, as indicated above, a recognized object may be a logo or expression such as a business name, brand name, etc. Some of the benefits of the embodiments described herein are that system 102 associates recognized objects (e.g., landmarks, logos, etc.) with social network signals, which system 102 associates with resources (e.g., websites, advertisements, pages, events, etc.). This enables embodiments that facilitate users in conveniently accessing such resources. In one embodiment, system 102 enables active association to resources, where the user may interact with a resource (e.g., accessing and interacting with a social network page). System 102 also enables passive associations to resources, where system 102 causes display advertisements, content advertisements, textual advertisements, etc. to be shown on websites or pages within or outside of the social network system.

Although the steps, operations, or computations described herein may be presented in a specific order, the order may be changed in particular embodiments. Other orderings of the steps are possible, depending on the particular implementation. In some particular embodiments, multiple steps shown as sequential in this specification may be performed at the same time.

While system 102 is described as performing the steps as described in the embodiments herein, any suitable component or combination of components of system 102 or any suitable processor or processors associated with system 102 may perform the steps described.

In various embodiments, system 102 may utilize a variety of recognition algorithms to recognize faces, landmarks, buildings, tourist sights, expressions, logos, events, objects, etc. in photos. Such recognition algorithms may be integral to system 102. System 102 may also access recognition algorithms provided by software that is external to system 102 and that system 102 accesses.

In various embodiments, system 102 enables users of the social network system to specify and/or consent to the use of personal information, which may include, for example, system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In one embodiment, system 102 enables users of the social network to specify and/or consent to the use of their photos for facial recognition in general. Example embodiments for recognizing faces and other objects are described in more detail below.

In various embodiments, system 102 obtains reference images or patterns, where each reference pattern includes a known pattern. The pattern is known, in that system 102 has identity information associated with the pattern such as an expression or name and other profile information. In one embodiment, a reference pattern may be, for example, a profile image that a user has uploaded. Such patterns may include images of faces, landmarks, buildings, tourist sights, expression, logos, events, etc. In one embodiment, a reference pattern may be based on a composite of a group of reference patterns.

In one embodiment, to recognize a pattern in a photo, system 102 may compare the pattern (i.e., image of the face, landmark, building, tourist sight, expression, logo, event, etc.) and match the pattern to reference patterns. For ease of illustration, the recognition of one pattern is described in some of the example embodiments described herein. These embodiments may also apply to each pattern of multiple patterns to be recognized.

In one embodiment, system 102 may search reference patterns in order to identify any one or more reference patterns that are similar to the pattern to be recognized in the photo.

In one embodiment, for a given reference pattern, system 102 may extract features from the pattern to be recognized in a photo for analysis, and then compare those features to those of one or more reference patterns. For example, with regard to a face to be recognized, system 102 may analyze the relative position, size, and/or shape of facial features such as eyes, nose, cheekbones, mouth, jaw, etc. A similar analysis may be applied to features of non-facial objects (e.g., landmark, building, tourist sight, expression, logo, event, etc.) to be recognized in a photo. In one embodiment, system 102 may use data gathered from the analysis to match the pattern in the photo to one more reference patterns with matching or similar features. In one embodiment, system 102 may normalize multiple reference patterns and compress data from those patterns into a composite representation having information (e.g., feature data), and then compare the pattern in the photo to the composite representation for facial or pattern recognition.

In some scenarios, the pattern in the photo may be similar to multiple reference patterns. As such, there would be a high probability that the known entity associated with the pattern in the photo is the same entity associated with the reference patterns.

In some scenarios, the pattern in the photo may be similar to multiple reference patterns. As such, there would be a moderately high yet decreased probability that the entity in the photo matches any given entity associated with the reference patterns. To handle such a situation, system 102 may use various types of facial or pattern recognition algorithms to narrow the possibilities, ideally down to one best candidate.

For example, in one embodiment, to facilitate in recognition, system 102 may use geometric recognition algorithms, which are based on feature discrimination. System 102 may also use photometric algorithms, which are based on a statistical approach that distills a feature into values for comparison. A combination of the geometric and photometric approaches could also be used when comparing the pattern in the photo to one or more references.

Other recognition algorithms may be used. For example, system 102 may use recognition algorithms that use one or more of principal component analysis, linear discriminate analysis, elastic bunch graph matching, hidden Markov models, and dynamic link matching. It will be appreciated that system 102 may use other known or later developed recognition algorithms, techniques, and/or systems.

In one embodiment, system 102 may generate an output indicating a likelihood (or probability) that the pattern in the photo matches a given reference pattern. In one embodiment, the output may be represented as a metric (or numerical value) such as a percentage associated with the confidence that the pattern in the photo matches a given reference pattern. For example, a value of 1.0 may represent 100% confidence of a match. This could occur, for example, when compared patterns are identical or nearly identical. The value could be lower, for example 0.5 when there is a 50% chance of a match. Other types of outputs are possible. For example, in one embodiment, the output may be a confidence score for matching.

Embodiments described herein provide various benefits. For example, embodiments facilitate users in discovering and accessing resources such as webpages in a social network system. Embodiments described herein also increase overall engagement among users in a social networking environment.

Figure 6:
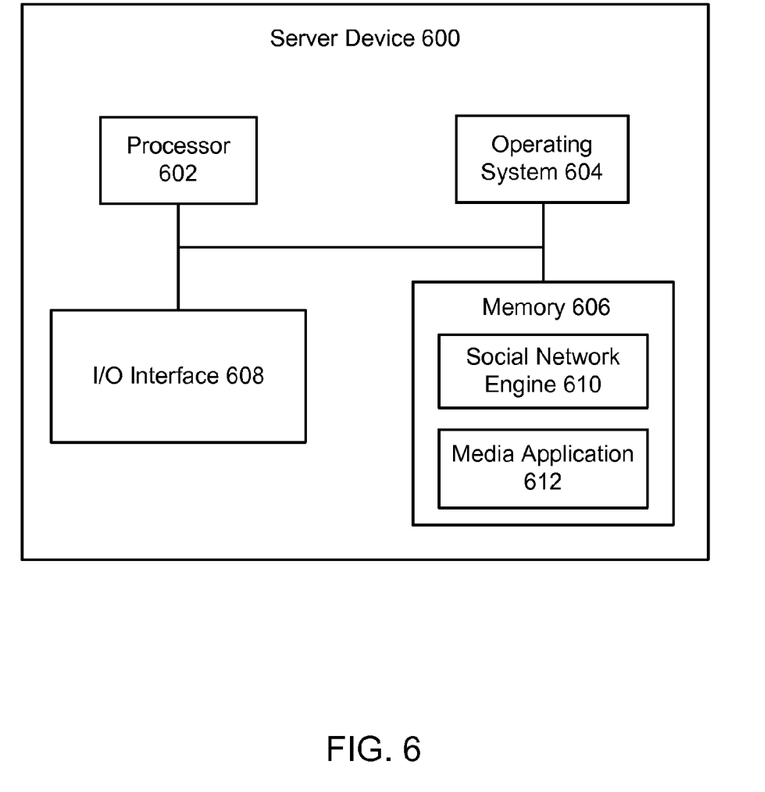
FIG. 6 illustrates a block diagram of an example server device, which may be used to implement the embodiments described herein.

FIG. 6 illustrates a block diagram of an example server device 600, which may be used to implement the embodiments described herein. For example, server device 600 may be used to implement server device 104 of FIG. 1, as well as to perform the method embodiments described herein. In one embodiment, server device 600 includes a processor 602, an operating system 604, a memory 606, and an input/output (I/O) interface 608. Server device 600 also includes a social network engine 610 and a media application 612, which may be stored in memory 606 or on any other suitable storage location or computer-readable medium. Media application 612 provides instructions that enable processor 602 to perform the functions described herein and other functions.

For ease of illustration, FIG. 6 shows one block for each of processor 602, operating system 604, memory 606, I/O interface 608, social network engine 610, and media application 612. These blocks 602, 604, 606, 608, 610, and 612 may represent multiple processors, operating systems, memories, I/O interfaces, social network engines, and media applications. In other embodiments, server device 600 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method comprising:
    recognizing one or more faces of one or more people in at least one photo;
    recognizing at least one object in the at least one photo, wherein the at least one object is one of a logo, an expression, and a landmark;
    tagging the at least one object with an identifying tag, wherein the identifying tag is determined by a user of a social network;
    creating at least one indication of affinity or association between at least one person recognized in the at least one photo and the at least one object recognized in the at least one photo;
    associating the at least one indication with at least one resource, wherein the at least one resource is an entity of a social network system with which the least one recognized person can interact, wherein the at least one resource includes one or more of a social network advertisement, a social network page, a webpage;
    providing the at least one resource to one or more of the people recognized in the at least one photo; and
    providing a suggestion to one or more of the people recognized in the at least one photo to follow the at least one recognized object in the social network system.

2. A computer-implemented method comprising:
    recognizing one or more faces of one or more people in at least one photo;
    recognizing at least one object in the at least one photo;
    creating at least one indication of affinity or association between at least one person recognized in the at least one photo and the at least one object recognized in the at least one photo;
    associating the at least one indication with at least one resource, wherein the at least one resource is an entity of a social network system with which the least one recognized person can interact; and
    providing a suggestion to one or more of the people recognized in the at least one photo to follow the at least one recognized object in the social network system.

3. The method of claim 2, wherein the method further comprises enabling one or more of the people recognized in the at least one photo to follow the at least one recognized object by adding the at least one resource to a social network group, and wherein the at least one resource is associated with the at least one object.

4. The method of claim 2, wherein the at least one object is an expression.

5. The method of claim 2, wherein the at least one object is a landmark, and wherein the at least one resource is associated with the landmark.

6. The method of claim 2, wherein the method further comprises adding the at least one resource to a social network group.

7. The method of claim 2, further comprising enabling a user to determine an identifying tag to be associated with the at least one object.

8. The method of claim 2, further comprising suggesting an identifying tag to be associated with the at least one object.

9. The method of claim 2, wherein the at least one resource includes a social network advertisement.

10. The method of claim 2, wherein the at least one resource includes a social network page.

11. The method of claim 2, further comprising providing the at least one resource to one or more of the people recognized in the at least one photo.

12. A system comprising:
one or more processors; and
logic encoded in one or more tangible media for execution by the one or more processors and when executed operable to perform operations comprising:
recognizing one or more faces of one or more people in at least one photo;
recognizing at least one object in the at least one photo;
creating at least one indication of affinity or association between at least one person recognized in the at least one photo and the at least one object recognized in the at least one photo; and
associating the at least one indication with at least one resource, wherein the at least one resource is an entity of a social network system with which the least one recognized person can interact; and
providing a suggestion to one or more of the people recognized in the at least one photo to follow the at least one recognized object in the social network system.

13. The system of claim 12, wherein the logic when executed is further operable to perform operations comprising enabling one or more of the people recognized in the at least one photo to follow the at least one recognized object by adding the at least one resource to a social network group, and wherein the at least one resource is associated with the at least one object.

14. The system of claim 12, wherein the at least one object is a logo.

15. The system of claim 12, wherein the at least one object is an expression.

16. The system of claim 12, wherein the at least one object is landmark.

17. The system of claim 12, wherein the logic when executed is further operable to perform operations comprising tagging the at least one object with an identifying tag.

18. The system of claim 12, wherein the logic when executed is further operable to perform operations comprising enabling a user to determine an identifying tag to be associated with the at least one object.

19. The system of claim 12, wherein the logic when executed is further operable to perform operations comprising suggesting an identifying tag to be associated with the at least one object.

20. The system of claim 12, wherein the logic when executed is further operable to perform operations comprising providing the at least one resource to one or more of the people recognized in the at least one photo.

* * * * *